United States Patent
Bradley et al.

(10) Patent No.: US 7,191,293 B2
(45) Date of Patent: Mar. 13, 2007

(54) RECOVERING PENDING TRACE DATA WITHIN A DATA PROCESSING SYSTEM

(75) Inventors: Daryl Wayne Bradley, Cambridge (GB); Andrew Brookfield Swaine, Cambridge (GB); Sheldon James Woodhouse, Cambridge (GB); John Michael Horley, Cambridge (GB)

(73) Assignee: ARM Limited, Cambridge (GB)

( * ) Notice: Subject to any disclaimer, the term of this patent is extended or adjusted under 35 U.S.C. 154(b) by 317 days.

(21) Appl. No.: 10/801,137

(22) Filed: Mar. 16, 2004

(65) Prior Publication Data

US 2005/0210447 A1    Sep. 22, 2005

(51) Int. Cl.
*G06F 12/06*    (2006.01)
*G06F 9/44*    (2006.01)

(52) U.S. Cl. .................. 711/135; 717/128; 710/310

(58) Field of Classification Search ................ 711/135; 717/127, 128; 714/45; 710/310
See application file for complete search history.

(56) References Cited

U.S. PATENT DOCUMENTS

| | | | | |
|---|---|---|---|---|
| 5,802,272 A | * | 9/1998 | Sites et al. ................... 714/45 |
| 6,128,682 A | * | 10/2000 | Humpherys et al. ........ 710/301 |
| 6,219,827 B1 | * | 4/2001 | Man ............................. 711/135 |
| 6,367,036 B1 | * | 4/2002 | Hansen ........................ 711/135 |
| 6,604,210 B1 | * | 8/2003 | Alexander et al. ............. 714/39 |
| 7,100,151 B2 | * | 8/2006 | Johnsen et al. .............. 717/128 |
| 2004/0117717 A1 | * | 6/2004 | Swoboda ..................... 714/776 |

OTHER PUBLICATIONS

Bell et al.; Optimally Profiling and Tracing Programs; Jul. 1994; pp. 1319-1360.*
International Business Machines; Adaptive Trace-Directed Program Restructuring; Feb. 1994; pp. 115-116; IBM Technical Disclosure Bulletin; vol. 37, No. 02B.*
D Hildebrand, "A debugging tool for OS/2 Presentation Manager development", Microsoft Systems Journal, v5, n2, p. 63(11), Mar. 1990.*

* cited by examiner

Primary Examiner—Pierre-Michel Bataille
(74) Attorney, Agent, or Firm—Nixon & Vanderhye P.C.

(57) ABSTRACT

A trace data system is provided in which flush request signals are generated and passed to trace data sources to trigger them to output any buffered trace data they are storing which was generated prior to the flush request being signalled. When the trace data has been flushed from these trace data sources, they signal this by generating a flush complete signal. The flushing of trace data may advantageously be performed prior to a power-down operation and using a trace bus bridge.

26 Claims, 6 Drawing Sheets

RECOVERING PENDING TRACE DATA WITHIN A DATA PROCESSING SYSTEM

BACKGROUND OF THE INVENTION

1. Field of the Invention

This invention relates to data processing systems. More particularly, this invention relates to data processing systems including trace mechanisms operable to generate a trace data indicative of the behaviour and state of the data processing system being monitored.

2. Description of the Prior Art

It is known to provide data processing systems with trace mechanisms, such as the ETM systems designed by ARM Limited of Cambridge, England, that operate in conjunction with integrated circuit designs and SoC designs. As system designs become more complex, it is possible to have multiple sources of trace data within a system each generating their own stream of trace data. This trace data is typically then collected and routed out of the integrated circuit in a concatenated stream of trace data. In view of pin count constraints, it is not practical to provide separate dedicated outputs for each trace data source.

Within such a system having multiple trace data sources, it is desirable that they should include an ability to buffer their own trace data stream until an opportunity becomes available for this trace data stream to be output from the integrated circuit. Some trace data sources may have higher priority than other trace data sources and accordingly low priority trace data sources may need to buffer their trace data output for a significant amount of time.

Whilst the above approach is able to provide trace data monitoring of multiple elements within an overall system and work with a limited output capability from the integrated circuit, problems arise in that in some circumstances the trace data as it emerges from the integrated circuit may not include all of the data of interest around a particular operational point being investigated. Furthermore, changes of state or mode between different areas of the system may be inhibited due to the pending storage of trace data within areas of the integrated circuit which are to have their operational state or mode altered.

SUMMARY OF THE INVENTION

Viewed from one aspect the present invention provides an apparatus for processing data, said apparatus comprising:
data processing logic operable to execute data processing operations;
one or more trace data sources operable to generate respective streams of trace data for said data processing logic;
one or more trace data sinks operable to receive respective streams of trace data from said one or more trace data sources; and
at least one flush signal generator operable to generate a flush request signal passed to at least one of said one or more trace data sources to signal a flush point within any trace data buffered within said at least one of said one or more trace data sources; wherein
said at least one of said one or more trace data sources is operable to trigger a flush complete response when any trace data generated by said at least one trace data source prior to said flush point has been output to one of said one or more trace data sinks.

The present technique provides a system in which a flush signal is able to be passed from a flush signal generator to the trace data sources to mark a flush point and allow modified behaviour of the tracing system as a whole in response to the flushing operation.

As an example, a flush signal may be generated at a time when an operational point of interest is identified to force the output of all of the trace data from all of the trace sources surrounding that operational point of interest such that a comprehensive diagnostic picture may be obtained of the state of the system at that time.

A preferred feature of the present invention is that the one or more trace data sources are operable to continue to generate trace data following receipt of the flush request signal. Thus, the flushing mechanism is non-invasive in terms of its effect upon the system operation and the continued ability of the trace mechanisms to trace the system operation.

The flush complete response generated by a trace data source could take a variety of different forms depending upon the implementation and desired post-flush operation, but in preferred embodiments of the invention the flush complete response comprises generating a flush complete signal passed back to the flush signal generator once all data present at the time of receiving the flush request signal has been output.

In the circumstance where a flush signal generator is coupled to a plurality of trace data sources, this can operate to pass the flush request signal to all of those trace data sources whereupon receipt of a flush complete signal from all of the trace data sources indicates that all of the trace data generated by the plurality of trace data sources prior to the flush point has been output from those trace data sources.

It will be appreciated that the flush signal generator could take a variety of different forms and may be incorporated within one of several different elements of the trace data system as a whole. In one preferred embodiment the flush signal generator may be part of a trace data sink.

It will be appreciated that in a comprehensive trace data system able to cope with multiple trace data sources, it is convenient to provide trace data buses to connect the trace data sources to the trace data sinks and in the context of such an arrangement it is advantageous to provide bus bridges interposed within these trace data buses to deal with, for example, changes in voltage domain or the like.

In a trace data system including bus bridges, preferred embodiments may incorporate the flush signal generator as part of one or more of the bus bridges.

A particular problem encountered with tracing is how to deal with power-down and partial power-down of the systems concerned. There may be valuable tracing information present within the trace data sources which should be recovered therefrom prior to any power-down being made. In this context one or more of the bus bridges within the system may be formed as a power-down bus bridge operable upon receipt of a power-down signal to generate a flush request signal and to delay power-down of the one or more trace data sources until all trace data generated by those trace data sources prior to the flush point has been output.

The use of a power-down bus bridge to control such power-down behaviour has the advantage that such bus bridges may be placed within the trace data system bus network at a wide variety of different points with considerable flexibility allowing different power domains within the system as a whole to be properly controlled in regard to the way in which they are flushed of trace data prior to power-down.

The power-down bus bridge may also advantageously serve to force the associated trace bus into a predetermined state prior to power-down and thereby avoid bus conflicts and other unpredictable operation which might result from merely powering down the trace mechanism in an unknown condition.

It will be appreciated that the power-down performed in response to the power-down signal could be a power-down of the trace sources alone with the processing logic they are monitoring remaining active. This would be useful in situations where it was desired to reduce the power consumption of the system as a whole and when tracing was not required. As an example, during the normal end user operation of a system it would not be usual to trace its operation and accordingly it would be desirable to power-down the tracing and other diagnostic circuits within the system.

As an alternative to the above, it is also desirable in some circumstances that the processing logic associated with the trace data sources is powered down together with those trace data sources in response to a power-down operation.

In the above context it is usual, but not essential, for the data processing logic and its associated trace data sources to be within a common power domain within an integrated circuit comprising a plurality of power domains and for which it is desired to separately control the different power domains. The trace data source could be in a different power domain to the data processing logic; it may be desired to just power down the trace data sources.

The power-down use of the flush signal is not limited to the context of bus bridges and may be more generally applied to any sort of flush signal generator.

A further example of a trace data system component which may provide flush signal generation is a trace data funnel which operates to combine trace data signals received from a plurality of trace data sources via respective trace data buses onto a single trace data bus.

Viewed from another aspect the present invention provides a method of processing data, said method comprising the steps of:

executing data processing operations with data processing logic;

generating respective streams of trace data for said data processing logic with one or more trace data sources;

receiving respective streams of trace data from said one or more trace data sources with one or more trace data sinks operable; and generating with at least one flush signal generator operable a flush request signal passed to at least one of said one or more trace data sources to signal a flush point within any trace data buffered within said at least one of said one or more trace data sources; wherein said at least one of said one or more trace data sources is operable to trigger a flush complete response when any trace data generated by said at least one trace data source prior to said flush point has been output to one of said one or more trace data sinks.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
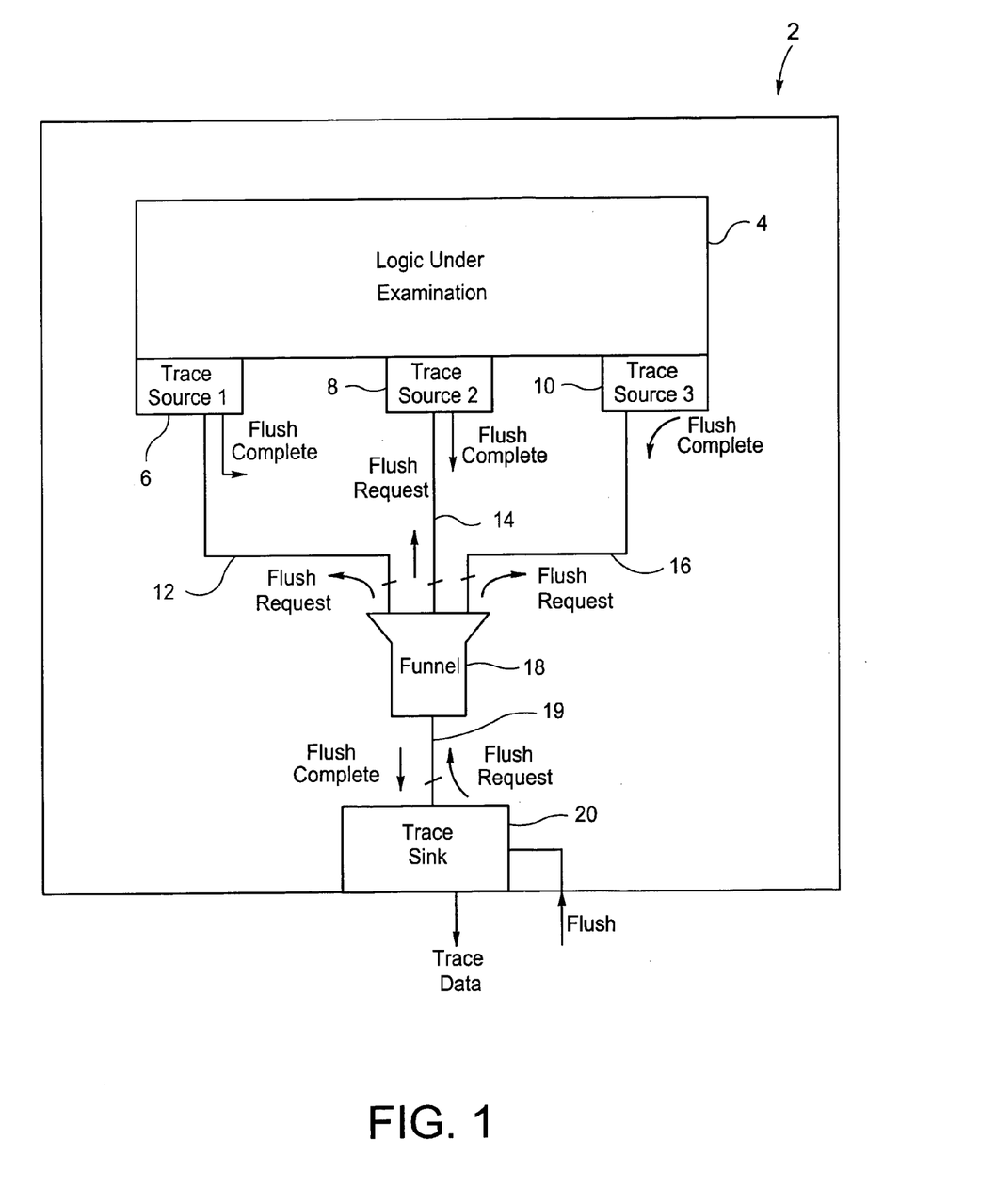
FIG. 1 schematically illustrates an integrated circuit comprising data processing logic and a trace data system.

FIG. 1 schematically illustrates an integrated circuit 2 incorporating processing logic 4, such as CPUs, DSPs, memories, caches, peripherals and the like, all coupled to a tracing system. The tracing system includes multiple trace data sources 6, 8, 10 connected via respective trace buses 12, 14, 16 to a trace data funnel 18. The trace data funnel 18 combines the trace data streams from the respective trace buses 12, 14, 16 and outputs a single trace data stream over a trace bus 19 to a trace sink 20, which in this example may be a unit for transmitting the trace data off-chip from the integrated circuit 2. This could also be an on-chip buffer.

As illustrated in FIG. 1, the trace sink 20 is responsive to an externally applied flush signal. (Note: Flush generation signal is external with respect to the trace sink 20, (not the SOC)). When this externally applied flush signal is received, a flush signal generated within the trace sink 20 serves to generate a flush request signal on the trace bus 19 and to pass this to the trace data funnel 18. This flush request signal may be a side-band signal associated with the main trace data bus and provided for the purpose of controlling flush type operations. Upon receipt of the flush request signal from the trace sink 20, the trace data funnel 18 relays this signal to each of its connected trace data sources 6, 8, 10 at substantially the same time via their respective trace buses 12, 14, 16. Within the trace data sources 6, 8, 10, the receipt of the flush request is used to mark a point, the flush point, within any buffered trace data they are storing to indicate which trace data was generated prior to the flush point and which trace data was generated after the flush point.

The trace data funnel 18 then serves to connect the trace data sources 6, 8, 10 to the trace sink 20 in priority order so as to drain their trace data content up to the point within the buffered trace data at which the flush pointer is located. When the flush point is reached, the trace data source concerned issues a flush complete signal back to the trace data funnel 18 indicating that all of the trace data that was generated prior to the flush point has been output. The trace data funnel 18 can then switch to the next highest priority trace data source 6, 8, 10 in order to empty it of trace data prior to the flush point even though there may still be pending, and continuing to be collected, trace data within the other trace data sources that could have a higher priority. The overall operation of the trace data funnel 18 in this way is to, in turn, collect all of the trace data prior to the flush point from the plurality of trace data sources 6, 8, 10 until this has all been drained from the system as is indicated by a flush complete signal having been received from each of the trace data sources 6, 8, 10. At this point, the trace data funnel 18 can itself issue a flush complete signal back to the trace sink 20.

Figure 2:
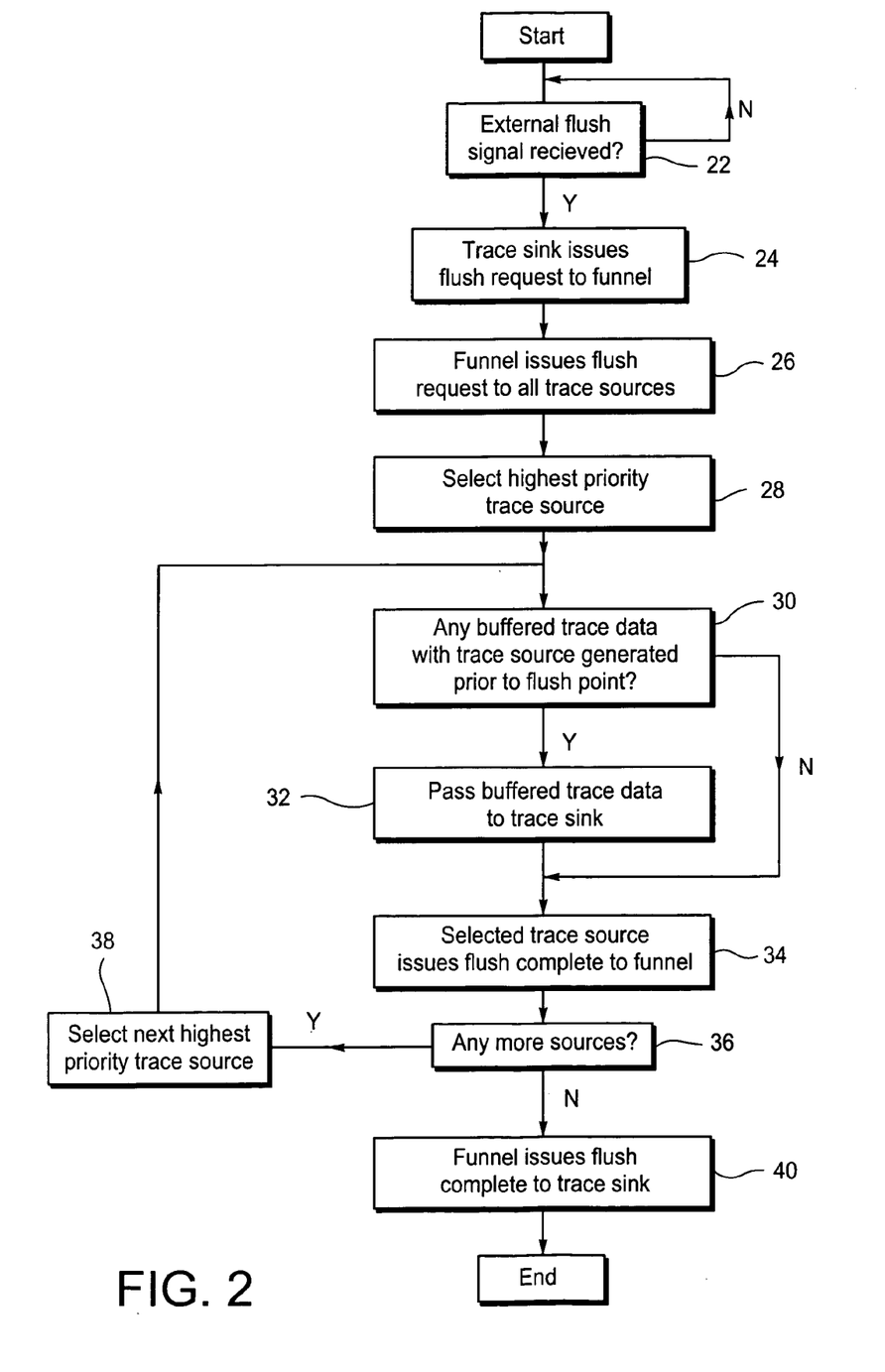
FIG. 2 is a flow diagram schematically illustrating the response of the trace data system of FIG. 1 to a flush signal.

FIG. 2 is a flow diagram schematically illustrating the operation of the circuit of FIG. 1. At step 22, the system waits for an external flush signal to be received. When this signal is received, processing proceeds to step 24 at which the trace sink issues a flush request to the trace data funnel. At step 26 the trace data funnel issues a flush request to all the trace sources attached to it. At step 28 the trace data funnel selects the highest priority trace data source from which trace data recovery is to start.

At step 30 a test is made for the presence of any buffered data within the selected trace data source that was generated prior to the flush point. If such buffered data is present, then step 32 serves to output this to the trace sink via the trace data funnel. If no such buffered data is present, then step 32 is bypassed.

At step 34, the selected trace data source issues a flush complete signal back to the funnel. This indicates to the funnel that the trace data source concerned is not storing any more trace data generated prior to the flush point. At step 36, a test is made as to whether there are any more trace data sources coupled to the trace data funnel which have not yet returned a flush complete signal. If there are any such trace data sources, then step 38 serves to select the next highest priority one of these and processing is returned to step 30. If all of the trace data sources have been drained up to the flush point, then processing proceeds to step 40 at which the funnel then issues a flush complete signal back to the trace sink.

Figure 3:
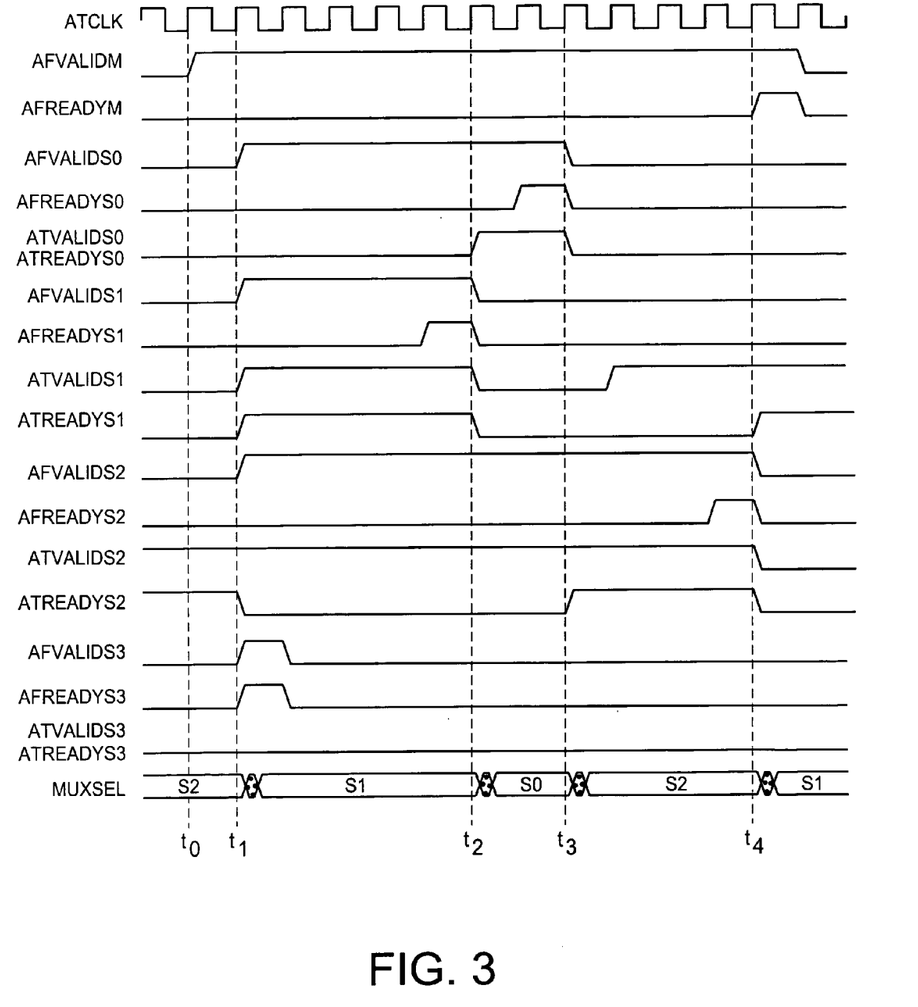
FIG. 3 is a signal timing diagram illustrating the control signals used to control the flushing behaviour of a plurality of trace sources.

FIG. 3 is a signal diagram schematically illustrating the flushing control signals which may be passed between a trace data source and a trace data sink within an embodiment having four trace data sources. This example has four sources connected to the first four Slave ports and they are configured to all be enabled with priorities reflecting the port number (Slave port 0 is the highest priority, 3 being the lowest).

Before point $t_0$, the system is under normal operation where different trace sources are selected according to the arbitration scheme, in this example Slave port 2. At $t_0$ there is a request from the track sink device to flush the system of historical data, this request is then propagated onto the slave ports in the following cycle ($t_1$). The trace funnel, at this point, will then be operating in a flushing mode where it will select in turn each device that has not been drained.

At $t_1$, the funnel selects Slave port 1 (highest priority with valid data) to drain first, at the same time the source connected to port 3 returns AFREADYS3 (indicating it has no data to drain) which causes AFVALIDS3 (indicating the flush is not pending for that source) to be de-asserted in the following cycle.

Draining of Slave port 1 continues until $t_2$ where it responds with AFREADYS1, the trace funnel would then switch to the next highest priority source that is still to drain (Slave port 2 in this example). In this example, this is over-ridden because a higher priority port reports valid data when it has not finished flushing; therefore Slave Port 0 is selected.

This continues until $t_3$ when AFREADYS0 goes high and draining of Slave Port 2 can begin which continues until $t_4$ (AFREADYS2 going high).

At point $t_4$ all Slave ports have responded with AFREADY high, this indicates that there is no more historical information remaining at this level. This is indicated in AFREADYM with a high response, which in-turn results in AFVALIDM returning low. The flush sequence is now complete and the trace funnel can return to normal operation, in this example by selecting Slave Port 1.

Note, Slave Port 1 is not selected for a second time before point $t_4$ even though it is at a higher priority than port 2; this is due to it already having returned AFREADYS1 high.

Figure 4:
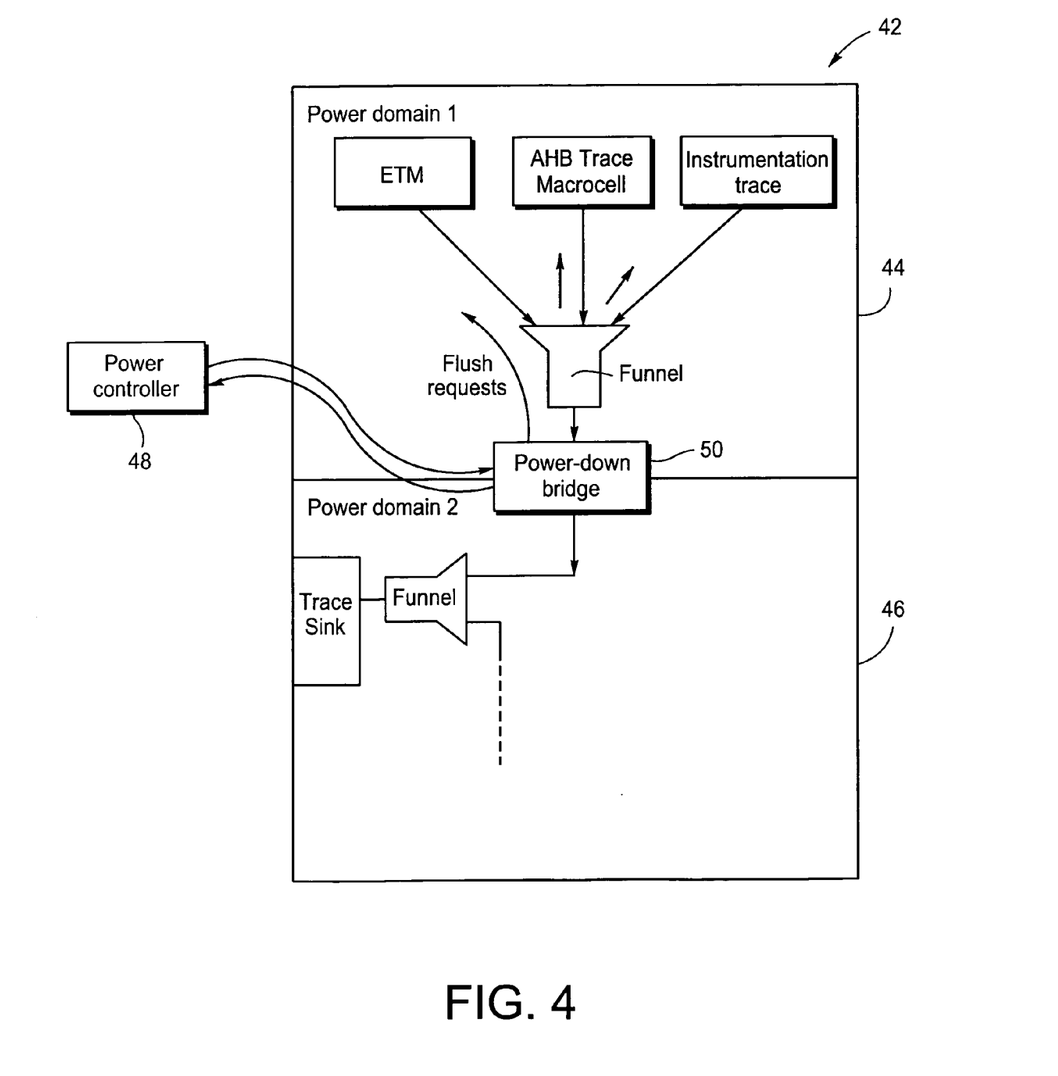
FIG. 4 is a diagram schematically illustrating an integrated circuit with multiple power domains and using a power-down bridge to trigger flushing of trace data from a power domain to be powered down.

FIG. 4 illustrates a further example integrated circuit 42 which in this case includes multiple power domains 44, 46. A power controller 48 serves to control the power supplies to these power domains 44, 46 in accordance with known techniques so as to reduce power consumption and the like. As part of this power control, the power controller 48 issues a power-down request which is also signalled to a power-down trace data bus bridge 50 sitting within the trace bus between power domain 44 and power domain 46. The power-down trace data bus bridge 50 responds to the power-down signal by issuing flush request signals upstream to all of the connected trace data sources and waiting until a flush complete signal is received back at the power-down trace data bus bridge 50 in accordance with the techniques previously described. The power-down trace data bus bridge 50 additionally serves the function of preventing the power-down of the power domain 44 until the flush complete signal is received back such that it can be ensured that all of the trace data from the trace data sources within the power domain 44 relating to the time before the power-down was initiated has been drained. When this flush complete signal is received, the power-down operations are allowed to proceed. It will be appreciated that the power-down could be of the trace data sources alone leaving the operational circuits they monitor in a powered condition for that normal operation. Alternatively the power-down could be of the complete domain.

Figure 5:
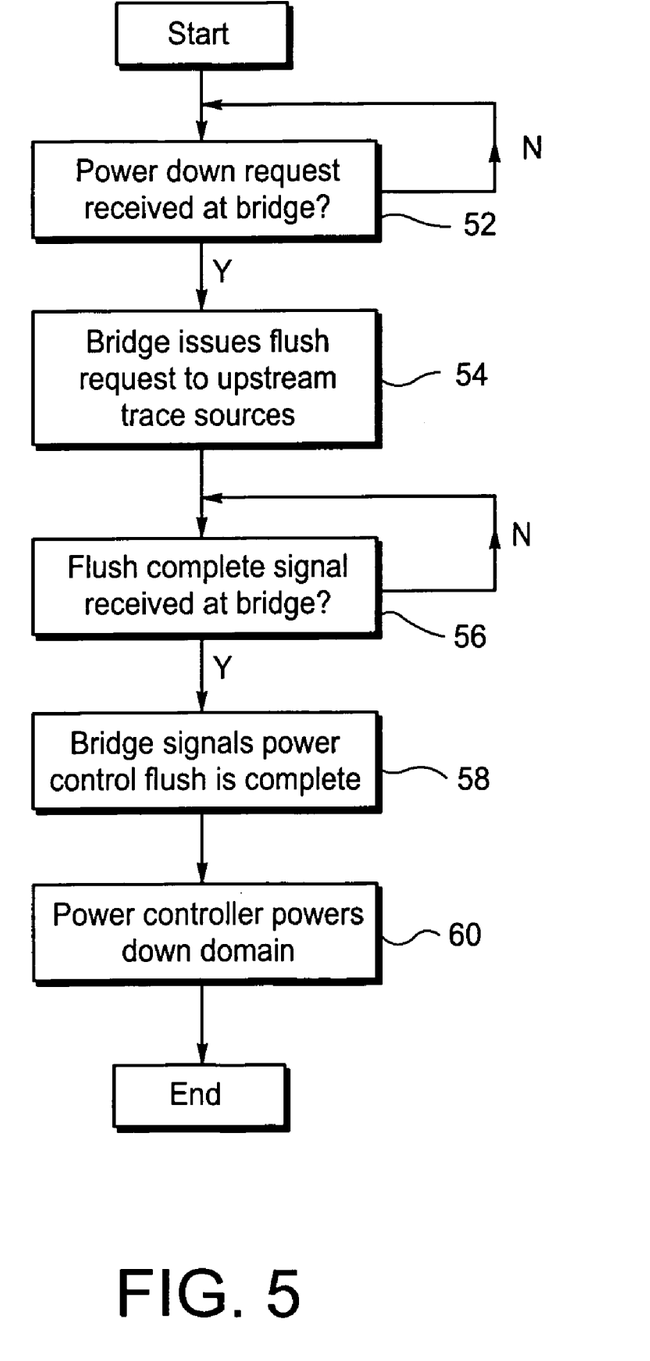
FIG. 5 is a flow diagram schematically illustrating the operation of the power-down bridge of FIG. 4.

FIG. 5 schematically illustrates the operation of the system of FIG. 4. At step 52, the bridge waits until a power-down request is received. At step 54, the bridge issues flush requests to all of the upstream trace sources. At step 56, the bridge waits until a flush complete signal is received back at the bridge. When this flush complete signal is received, the system proceeds to step 58 at which the bridge signals to the power controller that the flush is complete and the system is ready to be powered down and then at step 60 the power controller 48 can serve to power-down the power domain 44 as required.

Figure 6:
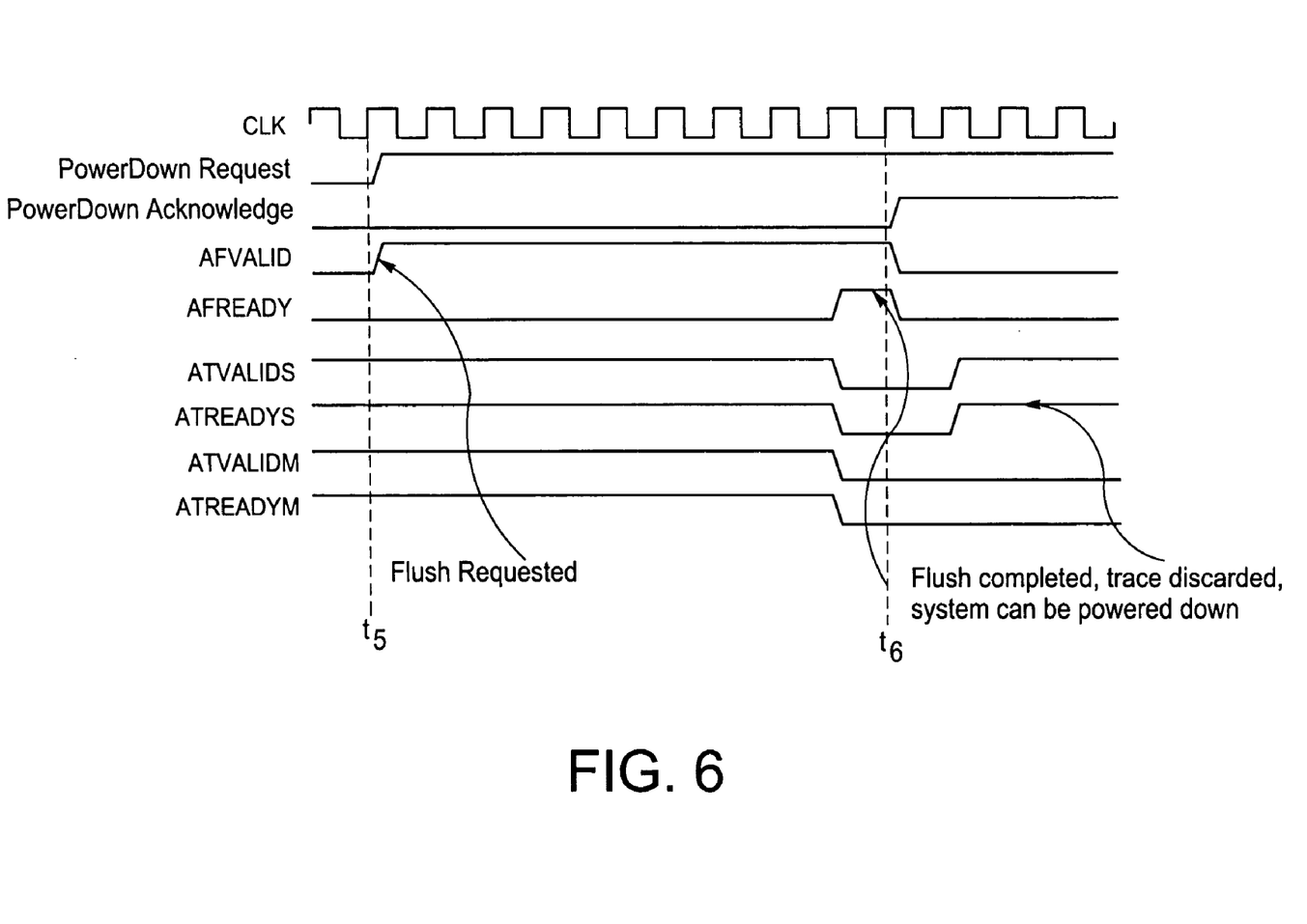
FIG. 6 is a signal timing diagram illustrating the power-down behaviour of a power-down flushing bridge.

FIG. 6 schematically illustrates the control signals associated with such power-down control. At point $t_5$, a power-down request is received by the bridge. The bridge then controls flushing of the trace sources in turn until a flush complete signal is received at time $t_6$ at which the power-down acknowledge signal can be returned to the power controller to allow the power controller to perform its power-down operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of processing data, said method comprising the steps of:
executing data processing operations with data processing logic;
generating respective streams of trace data for said data processing logic with one or more trace data sources;
receiving respective streams of trace data from said one or more trace data sources with one or more trace data sinks operable; and generating with at least one flush signal generator a flush request signal passed to at least one of said one or more trace data sources to signal a flush point within any trace data buffered within said at least one of said one or more trace data sources; wherein said at least one of said one or more trace data sources is operable to trigger a flush complete response when any trace data generated by said at least one trace data source prior to said flush point has been output to one of said one or more trace data sinks.

2. A method as claimed in claim 1, wherein said at least one of said one or more trace data sources continue to generate trace data following receipt of said flush request signal.

3. A method as claimed in claim 2, wherein said flush complete response comprises generating a flush complete signal passed to said at least one flush signal generator.

4. A method as claimed in claim 3, wherein said at least one flush signal generator passes said flush request signal to a plurality of trace data sources and receipt of flush complete signals from all of said plurality of trace data sources indicates all trace data generated by said plurality of trace data source prior to said flush point has been output.

5. A method as claimed in claim 1, wherein said at least one flush signal generator is part of a trace data sink.

6. A method as claimed in claim 1, wherein one or more trace data buses connect said one or more trace data sources to said one or more trace data sinks and at least one bus bridge is interposed within one of said one or more trace data buses, said at least one flush signal generator being part of one of said at least one bus bridge.

7. A method as claimed in claim 6, wherein said at least one bus bridge is a power-down bus bridge operable upon receipt of a power-down signal to generate a flush request signal and to delay power down of said one or more trace data sources until all trace data generated by said trace data sources prior to said flush point has been output.

8. A method as claimed in claim 7, wherein said power-down bridge bus forces said one of said one or more trace buses into a predetermined state prior to power down of said one or more trace data sources.

9. A method as claimed in claim 7, wherein said data processing logic for which said one or more trace data sources generates trace data is powered down with said one or more trace data sources.

10. A method as claimed in claim 9, wherein said data processing logic and said one or more trace data sources are within a common power domain within an integrated circuit comprising a plurality of power domains.

11. A method as claimed in claim 6, comprising a trace data funnel operable to combine trace data signals received from a plurality of trace data sources via respective trace data buses onto a single trace data bus.

12. A method as claimed in claim 11, wherein said at least one flush signal generator is part of said trace data funnel.

13. A method as claimed in claim 1, wherein said flush signal generator operable upon receipt of a power-down signal to generate and flush request signal and to delay power down of said one or more trace data sources until all trace data generated by said trace data sources prior to said flush point has been output.

14. Apparatus for processing data, said apparatus comprising:

data processing logic operable to execute data processing operations;

one or more trace data sources operable to generate respective streams of trace data for said data processing logic;

one or more trace data sinks operable to receive respective streams of trace data from said one or more trace data sources; and at least one flush signal generator for generating a flush request signal passed to at least one of said one or more trace data sources to signal a flush point within any trace data buffered within said at least one of said one or more trace data sources; wherein said at least one of said one or more trace data sources triggers a flush complete response when any trace data generated by said at least one trace data source prior to said flush point has been output to one of said one or more trace data sinks.

15. Apparatus as claimed in claim 14, wherein said at least one of said one or more trace data sources continue to generate trace data following receipt of said flush request signal.

16. Apparatus as claimed in claim 14, wherein said flush complete response comprises generating a flush complete signal passed to said at least one flush signal generator.

17. Apparatus as claimed in claim 16, wherein said at least one flush signal generator passes said flush request signal to a plurality of trace data sources and receipt of flush complete signals from all of said plurality of trace data sources indicates all trace data generated by said plurality of trace data source prior to said flush point has been output.

18. Apparatus as claimed in claim 14, wherein said at least one flush signal generator is part of a trace data sink.

19. Apparatus as claimed in claim 14, wherein one or more trace data buses connect said one or more trace data sources to said one or more trace data sinks and at least one bus bridge is interposed within one of said one or more trace data buses, said at least one flush signal generator being part of one of said at least one bus bridge.

20. Apparatus as claimed in claim 19, wherein said at least one bus bridge is a power-down bus bridge operable upon receipt of a power-down signal to generate a flush request signal and to delay power down of said one or more trace data sources until all trace data generated by said trace data sources prior to said flush point has been output.

21. Apparatus as claimed in claim 20, wherein said power-down bridge bus forces said one of said one or more trace buses into a predetermined state prior to power down of said one or more trace data sources.

22. Apparatus as claimed in claim 20, wherein said data processing logic for which said one or more trace data sources generates trace data is powered down with said one or more trace data sources.

23. Apparatus as claimed in claim 22, wherein said data processing logic and said one or more trace data sources are within a common power domain within an integrated circuit comprising a plurality of power domains.

24. Apparatus as claimed in claim 19, comprising a trace data funnel operable to combine trace data signals received from a plurality of trace data sources via respective trace data buses onto a single trace data bus.

25. Apparatus as claimed in claim 24, wherein said at least one flush signal generator is part of said trace data funnel.

26. Apparatus as claimed in claim 14, wherein said flush signal generator operable upon receipt of a power-down signal to generate and flush request signal and to delay power down of said one or more trace data sources until all trace data generated by said trace data sources prior to said flush point has been output.

* * * * *